(No Model.) 2 Sheets—Sheet 1.
J. R. McMANUS & T. F. HART.
MACHINE FOR MANUFACTURING SHOE STIFFENINGS.
No. 568,868. Patented Oct. 6, 1896.
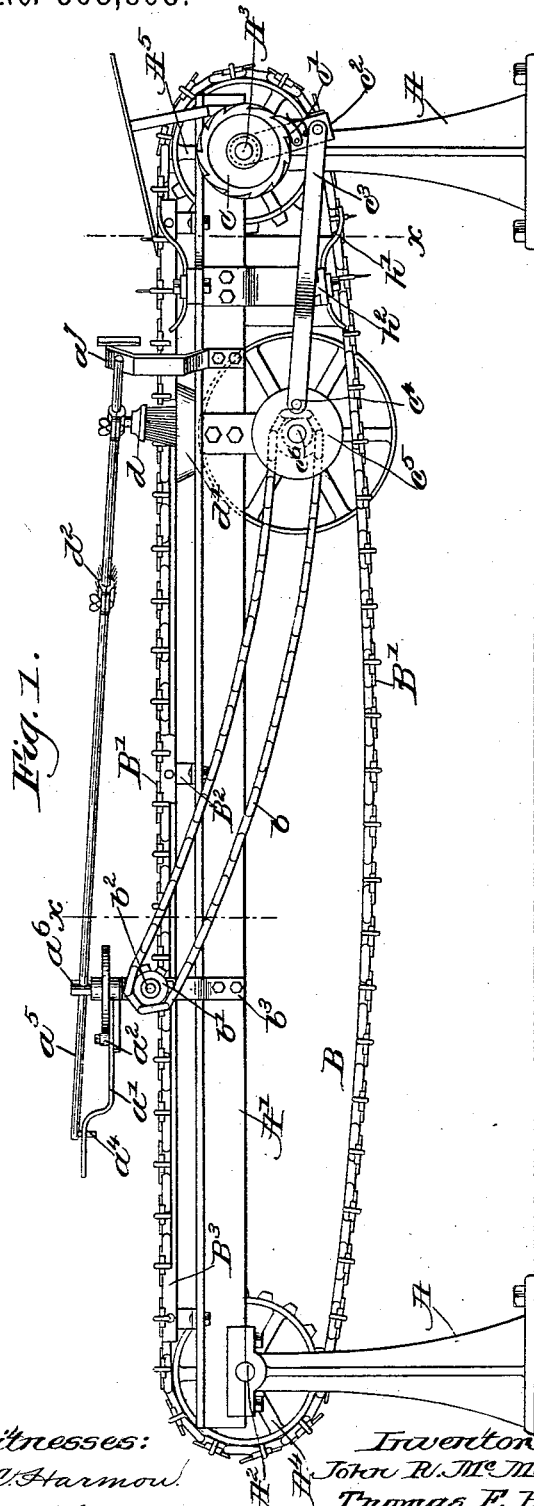
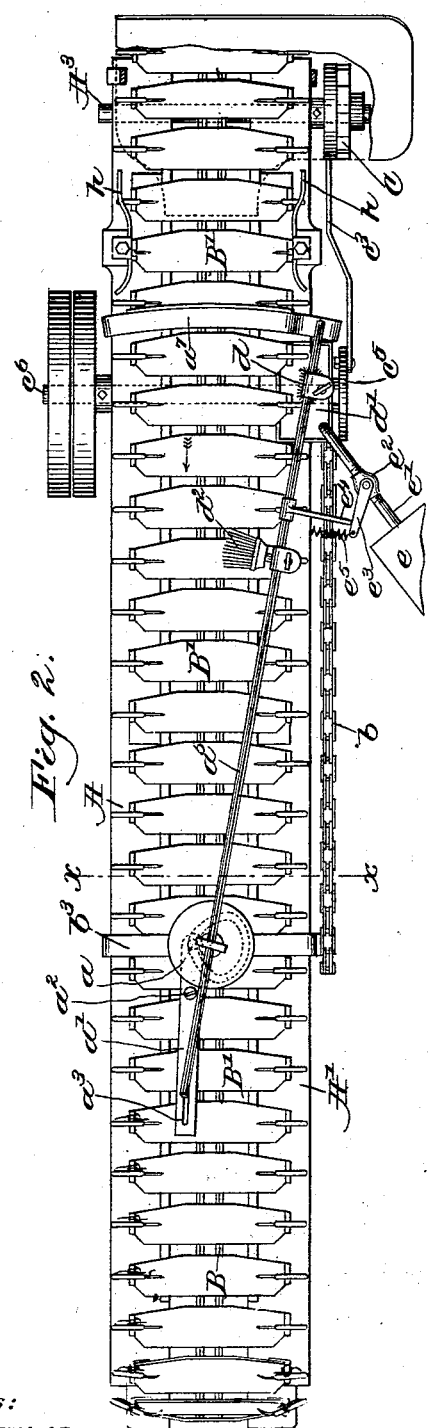
Fig. 1.
Fig. 2.
Witnesses:
A. C. Harmon
Thomas J. Drummond
Inventors:
John R. McManus.
Thomas F. Hart.
by Crosby & Gregory
attys.

(No Model.) 2 Sheets—Sheet 2.
J. R. McMANUS & T. F. HART.
MACHINE FOR MANUFACTURING SHOE STIFFENINGS.
No. 568,868. Patented Oct. 6, 1896.
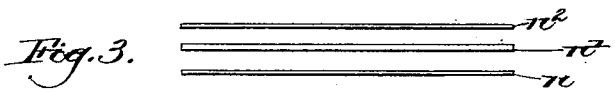
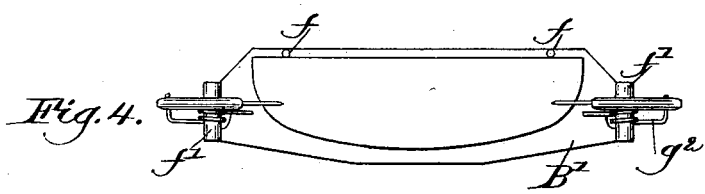
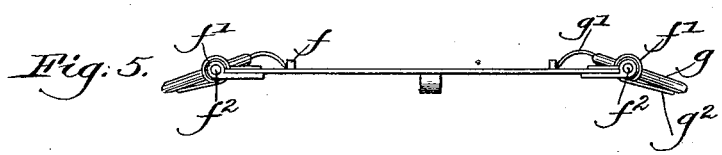
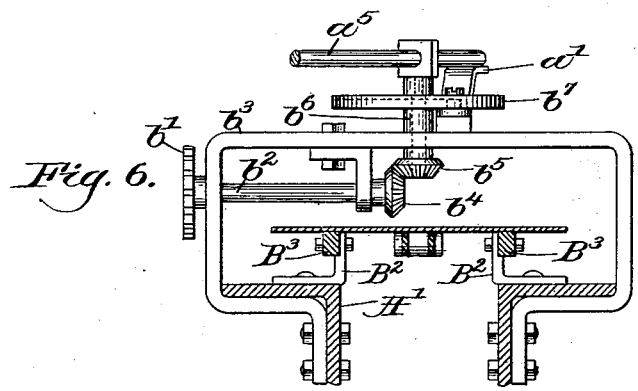
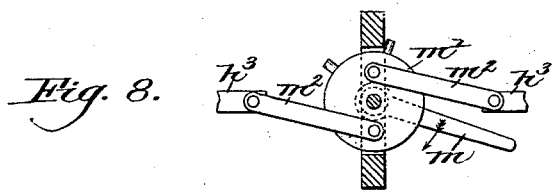
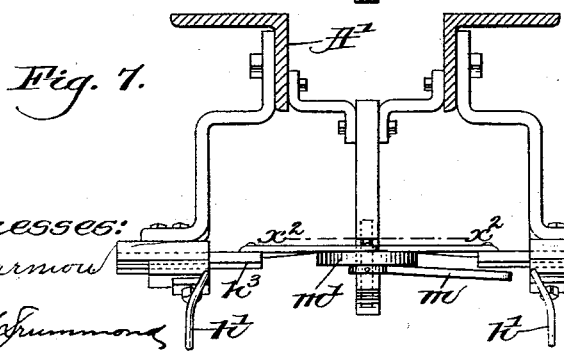

UNITED STATES PATENT OFFICE.

JOHN R. McMANUS AND THOMAS F. HART, OF LYNN, MASSACHUSETTS.

MACHINE FOR MANUFACTURING SHOE-STIFFENINGS.

SPECIFICATION forming part of Letters Patent No. 568,868, dated October 6, 1896.

Application filed November 29, 1895. Serial No. 570,332. (No model.)

*To all whom it may concern:*

Be it known that we, JOHN R. MCMANUS and THOMAS F. HART, of Lynn, county of Essex, State of Massachusetts, have invented an Improvement in Machines for Manufacturing Shoe-Stiffenings, of which the following description, in connection with the accompanying drawings, is a specification, like letters on the drawings representing like parts.

This invention has for its object the production of a machine for the manufacture of shoe-stiffenings, including counters, box-toes, &c., wherever two or more layers of material are superimposed and united by means of cement or other suitable adhesive material. Commonly the better kind of this class of article is made of a layer of leather or other board having cemented to it at each side a layer of leather, and the pieces are cemented by hand and all the handling of the layers is by hand.

We have devised a machine by which the layers to be united are automatically provided with cement, and when cemented are put one piece on another by hand, and finally all the superimposed pieces are pressed together by mechanism.

Our improved mechanism, for the best results, comprises two machines, each having an endless carrier presenting plates or surfaces on which the pieces to be united to form the stiffening are laid and coated automatically with cement, the carrier being of sufficient length to enable the pieces cemented at one spot to travel far enough to dry somewhat and enable the cement to become tacky before another piece or layer already provided with cement is laid upon it.

Our invention consists in a machine for the manufacture of shoe-stiffenings, combined with an endless carrier having stiffening-supporting surfaces, of holding devices to engage and hold the stiffening-layers in place, substantially as will be described.

Figure 1, in side elevation, represents one of the machines embodying our invention, the second machine not being shown because just like it; Fig. 2, a top view thereof. Fig. 3 shows separated the three layers before they are applied together. Fig. 4 shows one of the plates with one of the stiffener-layers laid thereon and held in place; Fig. 5, a side view thereof; Fig. 6, a section in the line $x$, Figs. 1 and 2; Fig. 7, a sectional detail in the line $x'$; and Fig. 8, a section below the line $x^2$, Fig. 7.

In the practice of our invention we prefer to use side by side two machines substantially alike, but herein we need describe specifically but one of the machines, briefly referring at times to its mate.

The uprights A A are joined together by suitable angle-irons A' to thus constitute a suitable framework. The framework has bearings for the shafts $A^2$ $A^3$, provided with sprocket-wheels $A^4$ $A^5$, over which is extended an endless carrier, herein shown as a chain B, the links of the chain having jointed to them the supports B', on which are laid the portions or layers of leather, leather-board, &c., used in the stiffening to be made.

The angle-irons have stands $B^2$, which support tracks $B^3$, on which rest and travel the supports B'. The shaft $A^3$ has an attached ratchet-wheel C, which is engaged by a pawl $c'$ on a pawl-carrier $c^2$, pivoted on the shaft $A^3$, the pawl-carrier being actuated by a link $c^3$, connected to a crank-pin $c^4$ of a disk $c^5$, fast on the main shaft $c^6$, having at one end a suitable fast and loose pulley, to which is applied the power for the driving-machine.

The main shaft has a suitable sprocket or chain wheel which drives a chain $b$, which is extended over a sprocket-wheel $b'$ on a shaft $b^2$, (see Fig. 6,) having its bearings in a suitable yoke $b^3$, and provided with a bevel-gear $b^4$, engaging a bevel-gear $b^5$ on a shaft $b^6$, (shown by dotted lines, Fig. 6,) having fixed to it a cam disk or plate $b^7$, having at its under side a cam-groove (shown by dotted lines, Fig. 2) in which enters a roller or other stud $a$ of a lever $a'$, pivoted at $a^2$, the cam swinging the lever about its pivot.

The lever $a'$ is shown as provided with a slot $a^3$, which receives a pin $a^4$ of a brush-carrier $a^5$, shown as a rod mounted on a pivotal pin $a^6$, said rod having its outer or free end arranged to travel over and rest on a bridge $a^7$, one end of the bridge being of cam shape to enable the end of the rod to descend far enough to enable a brush $d$, suitably clamped to said rod, to descend into a pan $d'$ to take up cement, preferably a rubber cement, and apply it to the layer of stiffener material lying on the support then stationary in the sweep-line of the brush. The rod has a finishing-brush $d^2$ suitably clamped to it, which acts on the uppermost layer of the stiffening to crowd it firmly down on the middle layer. Either of these brushes may be turned down in position to act, as may be desired.

The pan is supplied automatically, at suitable times, with cement from a fountain $e$, having a pipe $e'$, provided with a valve $e^2$, provided with a handle $e^3$, adapted to be struck by an arm $e^4$ on the rod $a^5$ each time that the brush $d$ enters the pan, a spring $e^5$ closing the valve when the rod $a^5$ starts to move the brush to apply cement.

The supports have near one edge suitable pins or projections $f$, which serve to regulate the layers of the stiffening on the support, and each support has pivoted to it suitable ears $f'$, which support pins $f^2$, forming pivots for the stiffener-holders, made as levers $g$, having fingers provided with downturned ends to act on and securely hold the stiffening-layer while it is having cement applied to it, the finger being pointed, so as preferably to enter said layer. The holding device is normally kept with its finger in engagement with the layer by a suitable spring $g^2$.

To open the holders for the introduction of a stiffening layer, we have added to the machine two cross-arms $h\ h$, which, as each support comes in position to have a layer put on it, acts on the outer end of the holder and lifts the finger $g'$ from the support, affording an open space between the fingers and support for the introduction of the layer.

To discharge a cemented layer, we have provided other discharging-cams $h'$, attached to blocks $h^2$, fixed on slides $h^3$, fitted to slide in guideways $h^4$, and these cams $h'$ may be put into operative position by engaging the handle $m$ and housing the pivoted disk or plate $m'$, so that the links $m^2$, connected to the slides $m^3$, are driven in, but turning the said handle in the direction of the arrow on it (see Fig. 8) will put the cams $h'$ so far apart that they will not strike the holding devices and move them to cause the fingers of the holders to release the stiffening.

In the operation of our invention we shall have two of the machines herein described standing side by side, one girl usually attending each machine. Upon one of the machines we will place the lowermost layer $n$, (see Fig. 3,) supposed to be of leather, skiving, or other usual material, and upon the other like machine we will lay the intermediate layers $n'$, preferably of leather-board or similar paperboard, or it may be of leather. The attendants will apply to each one of the supports as they come uppermost at the front of the machine the layers referred to, the holding devices being then operated so that they will be laid upon the supports with their straightedges against the registering pins $f$, the holders during this operation being turned about their pivotal points by the arms $h$, so that they occupy a substantially vertical position, in which position the operator may freely, by a down motion, place the layers on the supports, and thereafter the endless series of supports will be moved and the holders will be permitted to turn down and engage the layers, and thereafter the layers will come under the brush $d$ and will have cement applied to their surfaces, and the cemented layers will be carried along to the end of the machine and back under the machine to the front again. In the meantime, it being supposed that rubber cement has been used, the cement, by the evaporation of the solvent in it, has become sufficiently tacky to have two parts applied together. In one machine, for instance the machine having the intermediate layers $n'$, we shall set the discharging devices $h'$ so that they will unlock the holders and will let the intermediate layer drop from the machine. The attendant will then take the intermediate layer, and, as soon as a support comes into position to let the arms $h$ again operate to turn the holder $g'$ into substantially vertical position, will lay the cemented surface of the intermediate layer $n'$ on top of the cemented surface of the layer $n$ on the other machine and the holders will be again automatically closed to engage the two layers, and when the support from which the intermediate layer $n'$ was discharged again comes uppermost the attendant will lay upon that support, the holding devices having been suitably opened, as described, the third or uppermost layer $n^2$, preferably again of leather, and the attendant will continue to supply the said supports with uppermost layers $n^2$ until the endless carrier is again filled. By the time that these "uppermost layers," so called, again come to the front of the machine all intermediate layers will have been cemented, discharged, and applied to the cemented under layers $n$, and the stiffenings composed of two layers $n$ and $n'$ will begin to arrive at the front of the machine, and as they arrive opposite the discharging devices $h'$ they will be discharged from the machine, and the attendant will take the two-part stiffening with its cemented surfaces and will take it to the other machine, putting its cemented surface in contact with the cemented surface of the uppermost layer $n^2$, the holders being again raised in substantially vertical position. During the next one or two movements of the supports the holders will be again closed upon the combined stiffener-layers, and said layers will be acted upon by the brush $d^2$, the cement-brush $d$ having for this third round of the machine been turned up for inaction, and the brush $d^2$, acting upon the uncemented side of the former undermost layer $n$, will smooth and compact, as it were, the three layers together firmly, the stiffener composed of these three layers being discharged when it arrives again opposite the discharging device $h'$.

By locating the holders at the ends of the supporting-surfaces and making them as narrow slim fingers the brush $d$ when applying the cement is enabled to cement the entire exposed surface of the layer, which would not be the case if the holders were made as flat springs grasping the longer edges of the layers, and should a flat spring having only a vertical movement toward and from the supports be employed the second layer of stiffening material with cement upon it could not be accurately applied to an already-cemented surface and pushed laterally underneath the spring against the stops, for the tacking-surfaces of the cement would preclude such operation.

We do not desire to limit ourselves to the exact shape shown for the actuating devices, as it will be obvious that other forms of holders and of devices for actuating the brush might be employed by a skilled mechanic, without the exercise of invention, without departing from the spirit or scope of our invention.

Having described our invention, what we claim, and desire to secure by Letters Patent, is—

1. In a machine for the manufacture of shoe-stiffenings, the combination with an endless carrier composed of a series of flexibly-connected stiffening-supporting surfaces, of holding devices pivotally mounted upon the opposite ends of the said supporting-surfaces and adapted when opened to expose an open space of substantially the length of the stiffening-layer to be applied to the stiffener-surface, and means to open and close the said holders, substantially as described.

2. In a machine for the manufacture of shoe-stiffenings, the combination with an endless carrier composed of a series of stiffening-supporting surfaces joined by a flexible connection, of registering devices applied to the side edges of said stiffening-supporting surfaces, and pivoted holders mounted upon the opposite ends of the said surfaces, and means to open and close the said holders to receive stiffening layers, substantially as described.

3. In a machine for the manufacture of shoe-stiffenings, the combination with an endless carrier, composed of a series of stiffening-supporting surfaces jointed together, holding devices pivotally mounted upon the opposite ends of said surfaces, means to open the said holders for the reception of stiffener-layers, and to thereafter close them on the said layers, of a brush, and means to automatically operate it to apply cement from one to the other end of the said layers, substantially as described.

4. In a machine for the manufacture of shoe-stiffenings, the combination with an endless carrier composed of a chain having attached to it a series of plates to constitute stiffening-supporting surfaces, of holding devices attached to the opposite ends of each of said plates to engage and hold the stiffening-layers in place on said plates, and devices to open the holders to enable a stiffening-layer to be applied to the supporting-surface, substantially as described.

5. In a machine for the manufacture of shoe-stiffenings, the combination with an endless carrier having stiffening-supporting surfaces, of holding devices to engage and hold the stiffening-layers in place, and devices to open the holders and effect the discharge of the cemented layers, substantially as described.

6. In a machine for the manufacture of shoe-stiffenings, the endless series of supports for the layers of stiffening material, and suitable holders to hold the same in place thereon, combined with a cement-holder, a brush, and means to actuate the brush to apply cement from one to the other end of the stiffener-layers, substantially as described.

7. In a machine for the manufacture of shoe-stiffenings, the endless series of supports for the layers of stiffening material, and suitable holders to hold the same in place thereon, combined with a brush to act on the superimposed stiffener-layers and smooth the united layers, substantially as described.

8. In a machine for the manufacture of shoe-stiffenings, the endless series of supports for the layers of stiffening material, and holders to hold the same in place thereon, combined with a cement-holder, a brush, and means to actuate the brush to apply cement from one to the other end of the stiffener-layers, and a brush to act on the superimposed stiffener-layers and smooth the united edges, substantially as described.

9. In a machine for the manufacture of shoe-stiffenings, the endless series of supports for the layers of stiffening material and holders to hold the same in place thereon, combined with a cement-holder, a brush, and means to actuate the brush to apply cement from one to the other end of the stiffener-layers, and devices to automatically supply the parts with cement, substantially as described.

In testimony whereof we have signed our names to this specification in the presence of two subscribing witnesses.

JOHN R. McMANUS.
THOMAS F. HART.

Witnesses:
JOHN C. EDWARDS,
AUGUSTA E. DEAN.